United States Patent
Ichimura

(10) Patent No.: US 10,734,780 B2
(45) Date of Patent: Aug. 4, 2020

(54) OPTICAL DEVICE

(71) Applicant: KABUSHIKI KAISHA TOSHIBA, Tokyo (JP)

(72) Inventor: Kouichi Ichimura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 16/429,134

(22) Filed: Jun. 3, 2019

(65) Prior Publication Data

US 2019/0288476 A1 Sep. 19, 2019

Related U.S. Application Data

(62) Division of application No. 15/903,894, filed on Feb. 23, 2018, now abandoned.

(30) Foreign Application Priority Data

Sep. 20, 2017 (JP) .................. 2017-180006

(51) Int. Cl.
*H01S 3/08* (2006.01)
*H01S 3/06* (2006.01)
(Continued)

(52) U.S. Cl.
CPC ............ *H01S 3/08059* (2013.01); *G02B 6/00* (2013.01); *G02B 6/12004* (2013.01);
(Continued)

(58) Field of Classification Search
CPC .. H01S 3/08059; H01S 3/1661; H01S 3/0621; H01S 3/0615; H01S 3/0627;
(Continued)

(56) References Cited

U.S. PATENT DOCUMENTS 5,461,637 A   10/1995   Mooradian et al.
5,502,737 A    3/1996   Chartier et al.
(Continued)

FOREIGN PATENT DOCUMENTS

JP   S56-47012 A    4/1981
JP   H5-55713 A     3/1993
(Continued)

OTHER PUBLICATIONS

Goto et al., "Cavity-enhanced spectroscopy of a rare-earth-ion-doped crystal: observation of a power law for inhomogeneous broadening," Optics Express (2013), 21:24332-43.
(Continued)

*Primary Examiner* — Yuanda Zhang
(74) *Attorney, Agent, or Firm* — Finnegan, Henderson, Farabow, Garrett & Dunner, L.L.P.

(57) ABSTRACT

According to one embodiment, an optical device includes a first mirror, a second mirror, and a first member. The first mirror has a first planar surface. The second mirror is spaced from the first mirror in a first direction crossing the first planar surface. The second mirror has a concave surface including a first region and a second region around the first region. First distance between the first region and the first planar surface in the first direction is longer than second distance between the second region and the first planar surface in the first direction. The first distance is half or less of curvature radius of the concave surface. The first member is light transmissive and solid. The first member includes a first portion provided between the first mirror and the second mirror. The first portion is in contact with the first planar surface and the concave surface.

20 Claims, 9 Drawing Sheets

(51) Int. Cl.
    *H01S 3/16* (2006.01)
    *G02B 6/00* (2006.01)
    *G02B 6/12* (2006.01)

(52) U.S. Cl.
    CPC .......... *H01S 3/0615* (2013.01); *H01S 3/0621* (2013.01); *H01S 3/0627* (2013.01); *H01S 3/1661* (2013.01); *G02B 2006/12104* (2013.01); *G02B 2006/12114* (2013.01)

(58) Field of Classification Search
    CPC .................. G02B 6/12004; G02B 6/00; G02B 2006/12114; G02B 2006/12104
    See application file for complete search history.

(56) References Cited

U.S. PATENT DOCUMENTS

| | | | |
|---|---|---|---|
| 5,610,934 A * | 3/1997 | Zarrabi | H01S 3/0627 372/22 |
| 5,732,100 A | 3/1998 | Thony et al. | |
| 5,754,333 A | 5/1998 | Fulbert et al. | |
| 5,844,932 A * | 12/1998 | Thony | H01S 3/0627 372/92 |
| 5,963,578 A * | 10/1999 | Fulbert | H01S 3/0627 372/101 |
| 5,999,325 A * | 12/1999 | Eda | G02B 3/0012 359/619 |
| 6,259,711 B1 | 7/2001 | Laurell | |
| 2002/0196548 A1 * | 12/2002 | Kuznetsov | H01S 5/18388 359/578 |
| 2003/0169797 A1 | 9/2003 | Aldaz et al. | |
| 2005/0007666 A1 | 1/2005 | Kuznetsov | |
| 2005/0180484 A1 | 8/2005 | Molva | |
| 2010/0088488 A1 | 4/2010 | Ichimura et al. | |
| 2014/0294034 A1 | 10/2014 | Zhu et al. | |
| 2015/0103343 A1 | 4/2015 | Smith et al. | |
| 2018/0003931 A1 * | 1/2018 | Nakamura | G02B 5/3083 |
| 2019/0267769 A1 * | 8/2019 | Katsuragawa | H01S 3/08018 |

FOREIGN PATENT DOCUMENTS

| | | |
|---|---|---|
| JP | 2008-275673 A | 11/2008 |
| JP | 4354891 B2 | 8/2009 |
| JP | 2010-72233 A | 4/2010 |
| JP | 2010-114336 A | 5/2010 |
| JP | 2010-123761 A | 6/2010 |
| JP | 2017-156689 A | 9/2017 |

OTHER PUBLICATIONS

Vahala, "Optical microcavities," Nature (2003), 424:839-846.

* cited by examiner

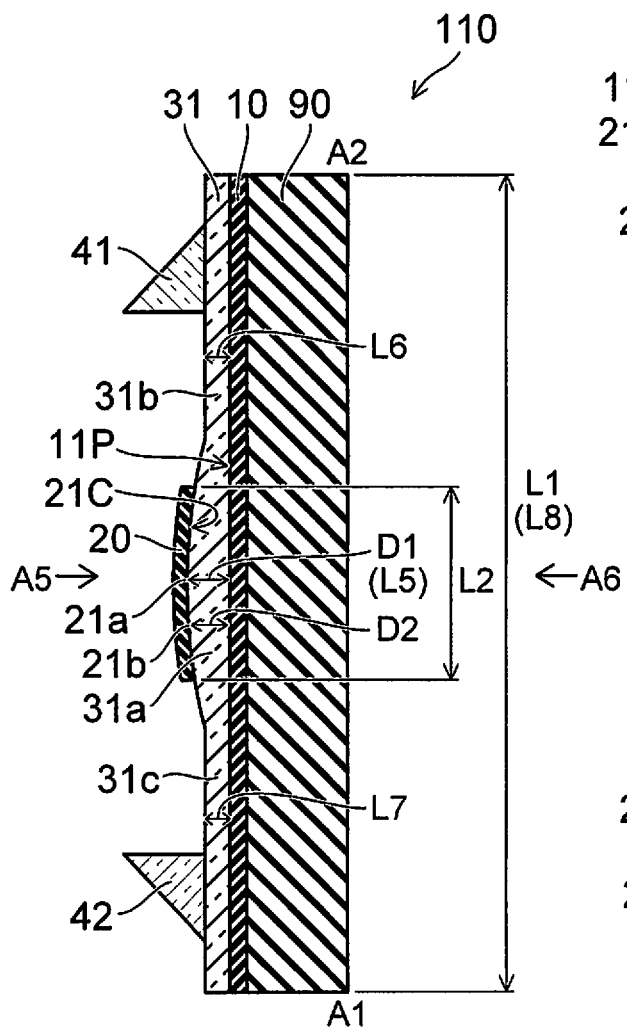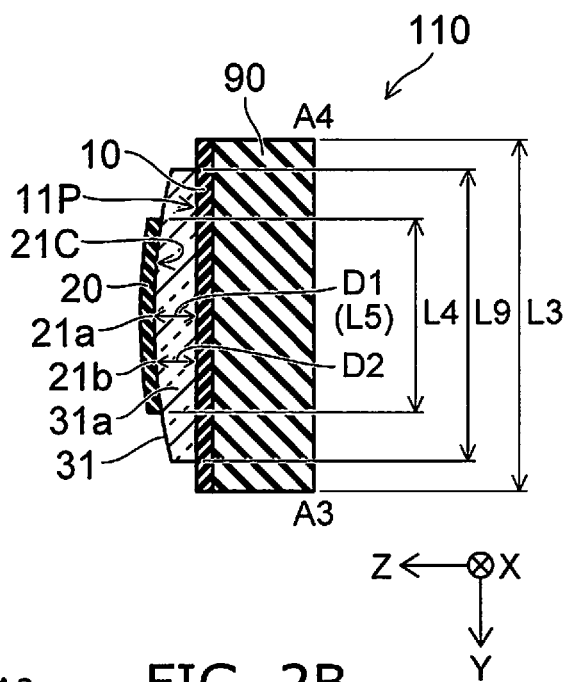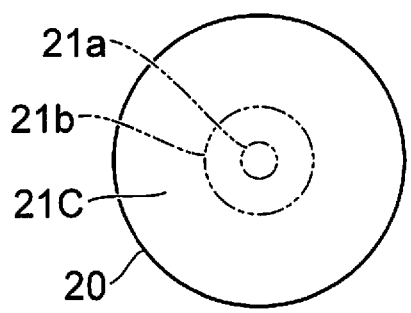
FIG. 2A
FIG. 2B
FIG. 2C

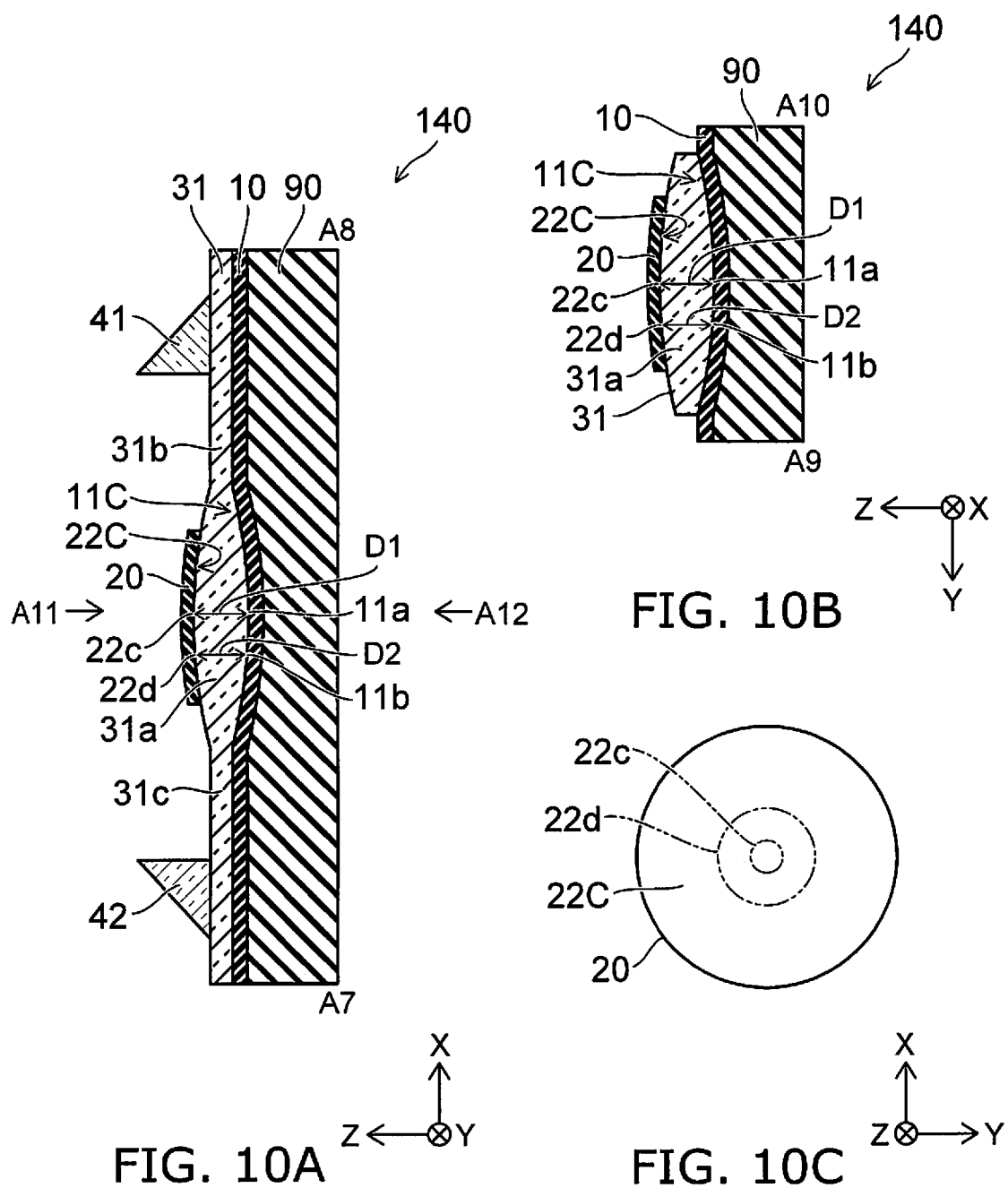

OPTICAL DEVICE

This application is a divisional of U.S. application Ser. No. 15/903,894, filed Feb. 23, 2018, which is based upon and claims the benefit of priority from Japanese Patent Application No. 2017-180006, filed on Sep. 20, 2017; the entire contents of which Applications are incorporated herein by reference.

CROSS-REFERENCE TO RELATED APPLICATIONS

This application is based upon and claims the benefit of priority from Japanese Patent Application No. 2017-180006, filed on Sep. 20, 2017; the entire contents of which are incorporated herein by reference.

FIELD

Embodiments described herein relate generally to a optical device.

BACKGROUND

There is known an optical device with two mirrors opposed to each other. An optical device with high performance is desired.

BRIEF DESCRIPTION OF THE DRAWINGS

FIGS. 1 and 2A to 2C are schematic views illustrating an optical device according to an embodiment;

FIGS. 9A, 9B, and 10A to 10C are schematic views illustrating an optical device according to the embodiment.

DETAILED DESCRIPTION

Figure 1:
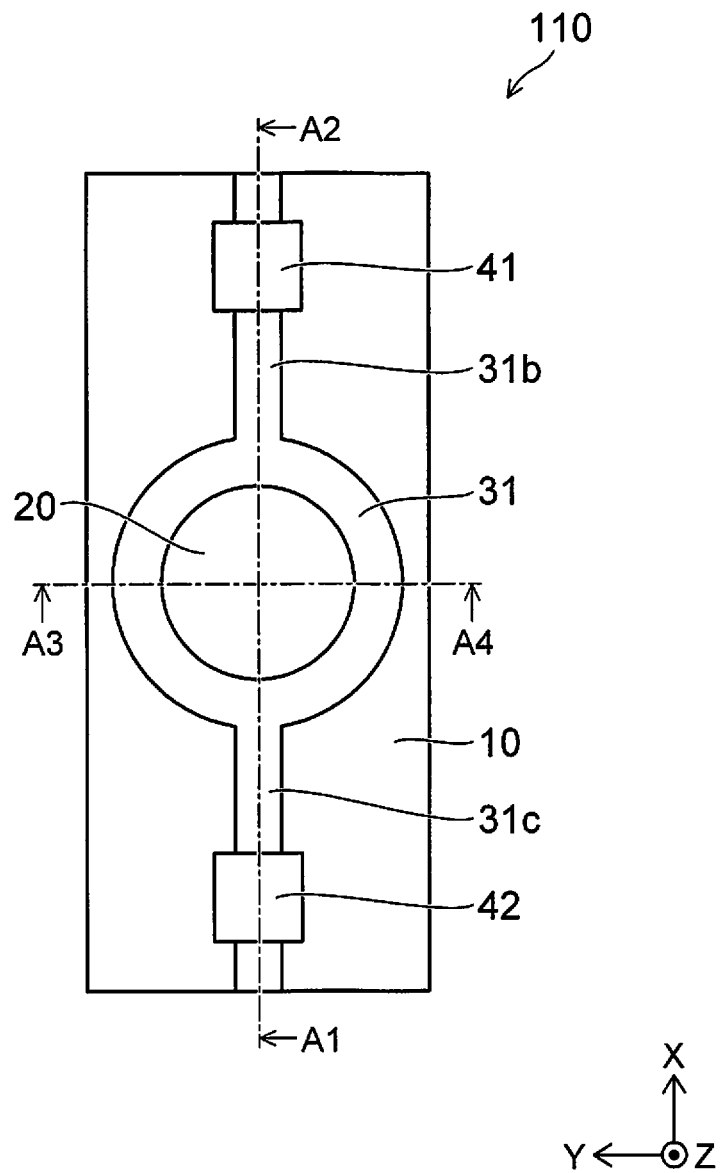

According to one embodiment, an optical device includes a first mirror, a second mirror, and a first member. The first mirror has a first planar surface. The second mirror is spaced from the first mirror in a first direction crossing the first planar surface. The second mirror has a concave surface including a first region and a second region around the first region. First distance between the first region and the first planar surface in the first direction is longer than second distance between the second region and the first planar surface in the first direction. The first distance is half or less of curvature radius of the concave surface. The first member is light transmissive. The first member is solid. The first member includes a first portion provided between the first mirror and the second mirror. The first portion is in contact with the first planar surface and the concave surface.

Embodiments of the invention will now be described with reference to the drawings.

The drawings are schematic or conceptual; and the relationships between the thicknesses and widths of portions, the proportions of sizes between portions, etc., are not necessarily the same as the actual values thereof. The dimensions and/or the proportions may be illustrated differently between the drawings, even in the case where the same portion is illustrated.

In the drawings and the specification of the application, components similar to those described thereinabove are marked with like reference numerals, and a detailed description is omitted as appropriate.

FIGS. 1 and 2A to 2C are schematic views illustrating an optical device according to an embodiment.

FIG. 2A is a sectional view taken along line A1-A2 of FIG. 1. FIG. 2B is a sectional view taken along line A3-A4 of FIG. 1. FIG. 1 is a plan view as viewed in the direction of arrow A5 of FIG. 2A. FIG. 2C is a plan view of the second mirror as viewed in the direction of arrow A6 of FIG. 2A.

As shown in FIGS. 1 and 2A to 2C, the optical device 110 according to the embodiment includes a first mirror 10, a second mirror 20, a first member 31, a first prism 41, a second prism 42, and a support part 90.

The first mirror 10 has a first planar surface 11P. The second mirror 20 is spaced from the first mirror 10 in a first direction crossing the first planar surface 11P. The second mirror 20 has a concave surface 21C. The concave surface 21C is opposed to the first planar surface 11P. The first mirror 10 is provided between the second mirror 20 and the support part 90.

The first direction lies along e.g. the Z-axis direction shown in FIG. 1. One direction perpendicular to the Z-axis direction is referred to as X-axis direction. The direction perpendicular to the X-axis direction and the Z-axis direction is referred to as Y-axis direction. A second direction lies along e.g. the X-axis direction. A third direction lies along e.g. the Y-axis direction.

The following describes the case where the first direction, the second direction, and the third direction lie along the Z-axis direction, the X-axis direction, and the Y-axis direction, respectively.

As shown in FIG. 2C, the concave surface 21C includes a first region 21a and a second region 21b around the first region 21a. As shown in FIGS. 2A and 2B, the first distance D1 along the Z-axis direction between the first region 21a and the first planar surface 11P is longer than the second distance D2 along the Z-axis direction between the second region 21b and the first planar surface 11P. For instance, the first region 21a crosses the axis passing through the center in the X-axis direction and the Y-axis direction of the second mirror 20. This axis lies along the Z-axis direction.

For instance, the length L1 in the X-axis direction of the first mirror 10 is longer than the length L2 in the X-axis direction of the second mirror 20. For instance, the length L3 in the Y-axis direction of the first mirror 10 is longer than the length L4 in the Y-axis direction of the second mirror 20. The length L1 is longer than the length L3. The length L2 is e.g. equal to the length L4. The length L2 may be different from the length L4.

The first member 31 is light transmissive. The first member 31 is solid. The first member 31 includes a first portion 31a located between the first mirror 10 and the second mirror 20 in the Z-axis direction. The first portion 31a is in contact with the first planar surface 11P and the concave surface 21C.

The first member 31 further includes e.g. a second portion 31b. The direction from the first portion 31a to the second portion 31b crosses the Z-axis direction. The first member 31 may further include a third portion 31c. The first portion 31a is located between the second portion 31b and the third portion 31c in the X-axis direction. The second portion 31b and the third portion 31c do not overlap the second mirror 20 in the Z-axis direction.

For instance, the length L6 along the Z-axis direction of the second portion 31b is shorter than the length L5 along the Z-axis direction of the first portion 31a. For instance, the length L7 along the Z-axis direction of the third portion 31c is shorter than the length L5.

In this example, the length L8 in the X-axis direction of the first member 31 is equal to the length L1. The length L9 in the Y-axis direction of the first member 31 is shorter than the length L3. The length L8 is longer than the length L2. The length L9 is longer than the length L4.

The first prism 41 and the second prism 42 are light transmissive. The first prism 41 and the second prism 42 are spaced from the second mirror 20 in the X-axis direction. The direction from part of the second portion 31b to the first prism 41 lies along the Z-axis direction. The direction from part of the third portion 31c to the second prism 42 lies along the Z-axis direction.

For instance, light is incident on the first prism 41. Then, the light is guided from the second portion 31b to the first portion 31a. Part of the light is guided from the first portion 31a to the third portion 31c and emitted from the second prism 42. The optical device 110 functions as an optical resonator. Here, "light" includes not only visible light, but also electromagnetic waves of wavelengths in other regions. For instance, "light" includes electromagnetic waves having a wavelength of 200 nm or more and 1 mm or less and visible light.

The first mirror 10 contains e.g. at least one selected from the first group consisting of $TiO_2$, $Ta_2O_3$, $SiO_2$, $MgF_2$, $TiO_3$, and $Nb_2O_5$. The first mirror 10 may include a plurality of layers. Each of these layers contains at least one selected from the first group. The second mirror 20 contains e.g. at least one selected from the second group consisting of $TiO_2$, $Ta_2O_3$, $SiO_2$, $MgF_2$, $TiO_3$, and $Nb_2O_5$. The second mirror 20 may include a plurality of layers. Each of these layers contains at least one selected from the second group.

The first member 31 contains e.g. at least one selected from the group consisting of $Y_2SiO_5$, $LF_3$, $SiO_2$, and C. The first member 31 may contain at least one selected from the group, and a rare-earth ion. The rare-earth ions are e.g. dispersed in the at least one material.

The first prism 41 and the second prism 42 contain e.g. at least one selected from the group consisting of BK7 and fused silica. The support part 90 contains e.g. at least one selected from the group consisting of $SiO_2$, Si, and glass.

The inventors have discovered that the performance of the optical device 110 can be improved when the optical device 110 includes the following configuration.

The concave surface 21C is e.g. spherical. The concave surface 21C lies along e.g. part of a sphere. For instance, the curvature of the concave surface 21C in a cross section including the X-axis direction and the Z-axis direction is equal to the curvature of the concave surface 21C in a cross section including the Y-axis direction and the Z-axis direction. The first distance D1 is 0.5 times or less the curvature radius of the concave surface 21C. Preferably, the first distance D1 is 0.3 times or less the curvature radius of the concave surface 21C. More preferably, the first distance D1 is 0.1 times or less the curvature radius of the concave surface 21C.

The concave surface 21C may not be spherical.

Application of one of the above configurations can improve e.g. the characteristic of the optical device. This characteristic is e.g. a characteristic in the case of using the coupling between the resonator mode occurring in the optical device and the physical system coupled to the resonator mode.

It is considered that this effect occurs for the following reason.

Figure 3:
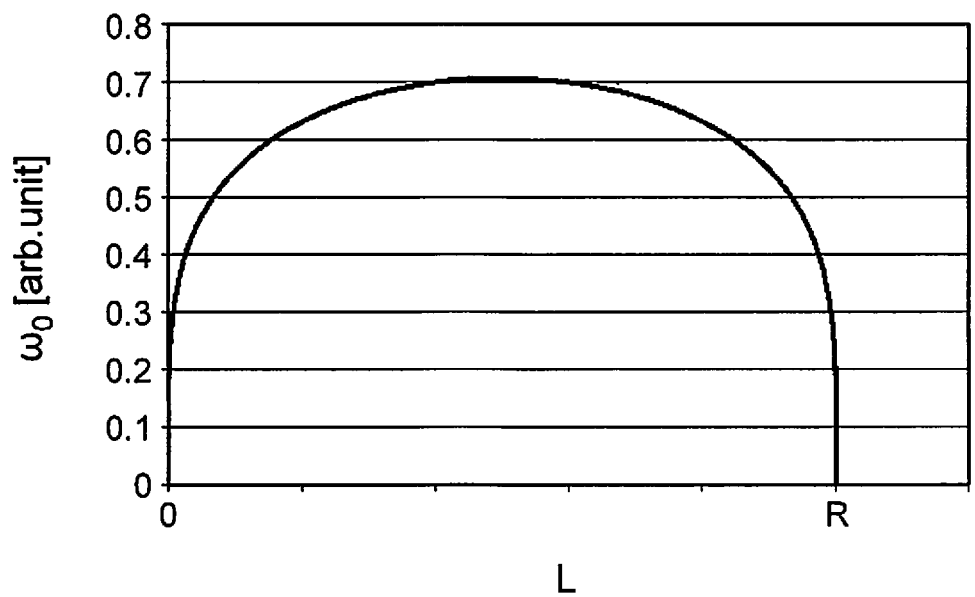
FIGS. 3 to 5 are graphs illustrating the characteristics of the optical device.
Figure 4:
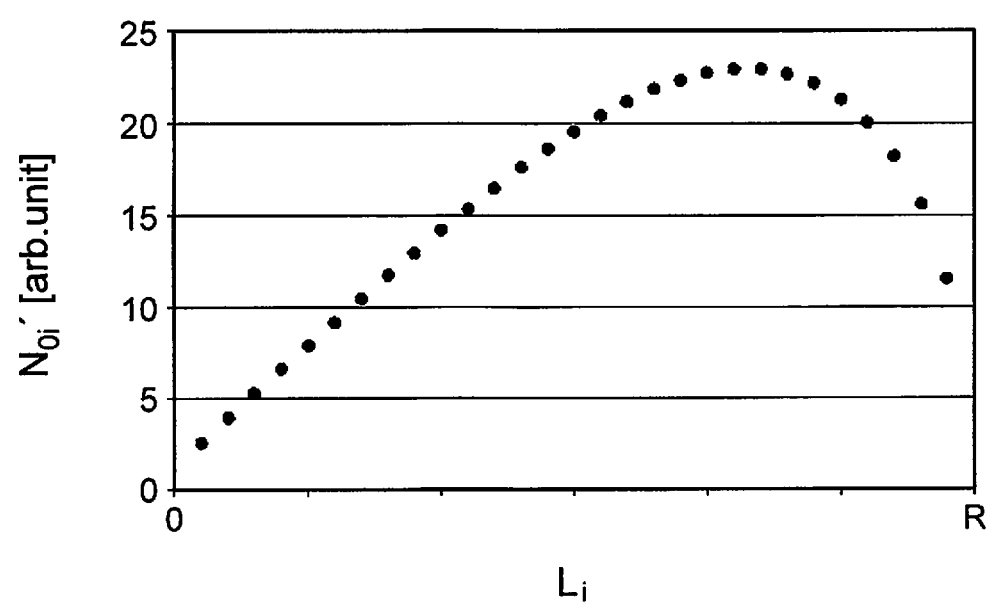
Figure 5:
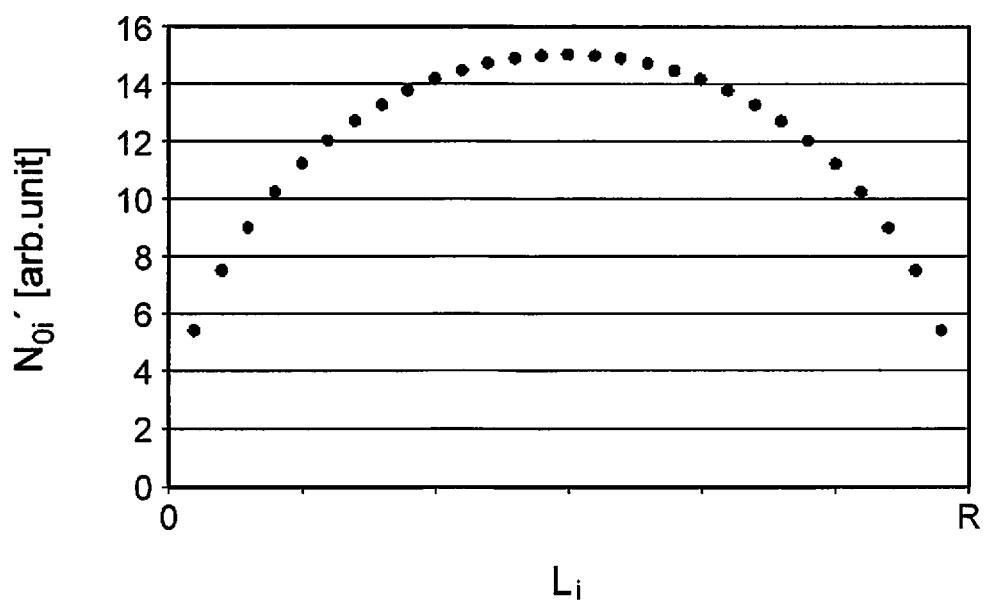

FIGS. 3 to 5 are graphs illustrating the characteristics of the optical device.

When the first distance D1 (resonator length L) is changed, in the resonator mode of the gaussian mode occurring in the optical device 110 (resonator), FIG. 3 shows the mode waist radius $\omega_0$ of the $TEM_{00}$ mode plotted with respect to L. The wavelength in a vacuum of the resonator mode is denoted by $\lambda$. The refractive index in the resonator is denoted by $n_{ri}$. The relationship represented by the following equation 1 exists among the mode waist radius $\omega_0$, the curvature radius R of the concave surface 21C, the resonator length L, $\lambda$, and $n_{ri}$. It is assumed that the anisotropy of the refractive index in the resonator is substantially absent, or negligible.

$$\omega_0 = \left(\frac{\lambda}{\pi n_{ri}}\right)^{\frac{1}{2}} \{(R-L)L\}^{\frac{1}{4}} \qquad \text{[Equation 1]}$$

The resonator mode ($TEM_{00}$ mode) of this resonator is coupled to the physical system included therein with a coupling strength g through optical transition of transition angular frequency $\omega_a = 2\pi c n_{ri}/\lambda$ (c: speed of light in a vacuum) of the physical system.

g depends on the position in the resonator mode. This is represented by the following equation 2 using the spatial distribution $\Psi(r)$ of the electric field amplitude of the resonator mode normalized so that its maximum is 1. $g_0$ included in equation 2 is represented by the following equation 3.

$$g = g_0 \psi(\vec{r}) \qquad \text{[Equation 2]}$$

$$g_0 = \frac{\mu}{n_{ri}} \sqrt{\frac{\omega_a}{2\hbar\varepsilon_0 V}} \qquad \text{[Equation 3]}$$

$\mu$ is the transition dipole moment of the transition of the physical system. $\hbar$ is the Dirac constant.

$\varepsilon_0$ is the dielectric constant of a vacuum. V is referred to as mode volume and corresponds to the volume of the distribution region of photons of the resonator mode. V is represented by the following equation 4 using $\Psi(r)$.

$$V = \int |\Psi(\vec{r})|^2 d^3\vec{r} \qquad \text{[Equation 4]}$$

Next, consider the critical atom number ($N_0$) of this physical system/resonator mode coupled system. $N_0$ serves as a figure of merit in various techniques, devices, and measurement methods using such a physical system/resonator mode coupled system. In general, a smaller $N_0$ indicates high performance of the physical system/resonator mode coupled system. $N_0$ is represented by the following equation 5.

$$N_0 = \frac{\kappa \Gamma}{g^2} \qquad \text{[Equation 5]}$$

κ is the relaxation rate of the resonator. Γ is the relaxation rate of the physical system. From equation 5, it is found that smaller $N_0$ can be obtained by making g larger. From equation 2, it is found that larger g can be obtained by making $g_0$ larger. From equation 3, it is found that larger $g_0$ can be obtained by making V smaller.

There is known a Fabry-Perot resonator in which two mirror surfaces are opposed to hold photons in the resonator only by reflection at the mirror surfaces. When the mode waist radius is narrowed to wavelength order, the mode is shaped like a circular cone or hourglass rather than a circular cylinder. Even in this case, the mode volume V is represented by the following equation 6 using the mode waist radius $\omega_0$ and the resonator length L.

$$V = \frac{1}{4}\pi\omega_0^2 L \qquad \text{[Equation 6]}$$

From this equation 6, it is found that for smaller $\omega_0$, V is smaller, and $N_0$ can be made smaller. It is considered that this can improve the performance of techniques and devices using the physical system/resonator mode coupled system. Thus, for instance, a physical system/resonator mode coupled system with smaller $\omega_0$ is considered.

As shown in FIG. 3, $\omega_0$ is smaller in the region of L nearly equal to R (L≈R region) and the region of L close to zero (L≈0 region). For instance, in order to make $N_0$ particularly small, it is considered to use the L≈R region for the following reason. As $\omega_0$ becomes smaller, V becomes smaller, and $g_0$ sharply becomes larger. However, it is considered that the resonator length and the relaxation rate of the physical system undergo small or no change. From equation 5, it is likely to be anticipated that $N_0$ becomes smaller. The physical system is easily inserted into the optical device. It is easy to apply manipulation light for manipulating the physical system.

On the other hand, in the L≈0 region, for instance, making $g_0$ larger by making V smaller also increases the optical loss (the number of photons lost per unit time) such as transmission, scattering, and absorption occurring at the mirror. Thus, it is not evident whether $N_0$ can be made smaller.

For instance, 29 resonators are fabricated. These resonators have an equal curvature radius R of the concave surface 21C and are different in the resonator length L, e.g., $L_i$=i× R/30 (i=1, 2, ..., 29). These resonators are monolithically fabricated by polishing the surface of the first member 31 that transmits light of the wavelength of the resonator mode. For each resonator, the dissipation $\kappa_i$ of the resonator is measured. $\kappa_i$ can be measured by observing the spectral width of the resonator mode.

$\kappa_i$ thus measured and $L_i$ are used to calculate $N_{0i}'$ represented by the following equation 7. This is graphically depicted in FIG. 4. Furthermore, a hollow resonator is fabricated from two mirrors having a similar reflectance. The graph obtained similarly is shown in FIG. 5.

$$N_{0i}'=\kappa_i L_i \sqrt{(R-L_i)L_i} \qquad \text{[Equation 7]}$$

The critical atom number $N_0$ of the resonators is represented by equation 5. When these resonators include a physical system, $N_0$ is minimized at the position of the mode waist where the coupling between the physical system and the resonator mode is maximized (the position where $\Psi(r)$ =1). From equations 1, 2, 3, 5, and 6, $N_0$ at this position is represented by the following equation 8. $C_1$ included in equation 8 is represented by the following equation 9.

$$N_0 = \frac{\kappa\Gamma}{g_0^2} = C_1 \kappa L \sqrt{(R-L)L} \qquad \text{[Equation 8]}$$

$$C_1 = \frac{\hbar\varepsilon_0 n_{ri} \lambda \Gamma}{2\mu^2 \omega_a} \qquad \text{[Equation 9]}$$

The critical atom number $N_{0i}$ at the mode waist represents the performance of each of the 29 resonators. The critical atom number $N_{0i}$ is represented by the following equation 10 from the constant $C_1$ taking the same value for the resonators, $L_i$ being different for each resonator, and $\kappa_i$ being different for each resonator and obtained by measurement. The constant $C_1$ is the same value for the resonators. $L_i$ and $\kappa_i$ are different for each resonator.

$$N_{0i}=C_1 \kappa_i L_i \sqrt{(R-L_i)L_i} \qquad \text{[Equation 10]}$$

Equation 10 is represented as the following equation 11.

$$N_{0i}=C_1 N_{0i}' \qquad \text{[Equation 11]}$$

That is, $N_{0i}$ is a constant multiple of $N_{0i}'$. The inventors have found from FIG. 4 that $N_{0i}$ can be made smaller more easily in the L≈0 region than in the L≈R region. With R being fixed, the difference (L−R) between L and R in the region of the first distance D1 (the resonator length L) longer than R/2 (including the L≈R region) is denoted by d1. L in the region of the first distance D1 (the resonator length L) shorter than R/2 (including the L≈0 region) is denoted by d2. Then, from equation 1, when d1=d2, the two resonators have an equal mode waist radius $\omega_0$. However, $N_{0i}$ is smaller in the region of the resonator length L shorter than R/2.

FIG. 5 shows that the superiority in the region of the resonator length L shorter than R/2 results from photon loss such as absorption and scattering occurring in the medium in the resonator. This is because the hollow resonator does not exhibit the superiority as shown in FIG. 5. It is considered that such superiority of the L≈0 region to the L≈R region occurs for the following reason.

The process in which photons are lost from the resonator includes photon loss such as transmission, scattering, and absorption occurring at the mirror and photon loss such as absorption and scattering occurring in the medium in the resonator. The former is inversely proportional to the resonator length L. The latter does not depend on the resonator length L if the medium is uniform. The former and latter photon losses are denoted by $C_2/L$ and $C_3$, respectively, using two constants. In this case, the relaxation rate κ of the resonator is represented by the following equation 12.

$$\kappa = \frac{C_2}{L} + C_3 \qquad \text{[Equation 12]}$$

Substituting this κ into equation 8 yields the following equation 13.

$$N_0=C_1(C_2+C_3 L)\sqrt{(R-L)L} \qquad \text{[Equation 13]}$$

This equation 13 represents a function indicating the behavior of the graph of FIG. 4. Equation 13 also indicates that for larger photon loss ($C_3$) such as absorption and scattering occurring in the medium in the resonator, $N_0$ has a larger difference between the region of the resonator length L longer than R/2 and the region of the resonator length L shorter than R/2. Equation 13 also indicates that shorter L can reduce the influence of the photon loss ($C_3$) such as absorption and scattering occurring in the medium in the resonator.

Use of the physical system/resonator coupled system in the region of the resonator length L shorter than R/2 is also advantageous to miniaturization of the optical device 110. In particular, use of the physical system/resonator coupled system in the L≈0 region is advantageous to miniaturization of the optical device 110. In the optical device 110 according to the embodiment, the mode waist is preferably 100 µm or less. Preferably, the optical device 110 according to the embodiment has a resonator mode of the gaussian mode. Preferably, the first member 31 has a propagation mode traversing the optical axis of the resonator mode.

Figure 6A:
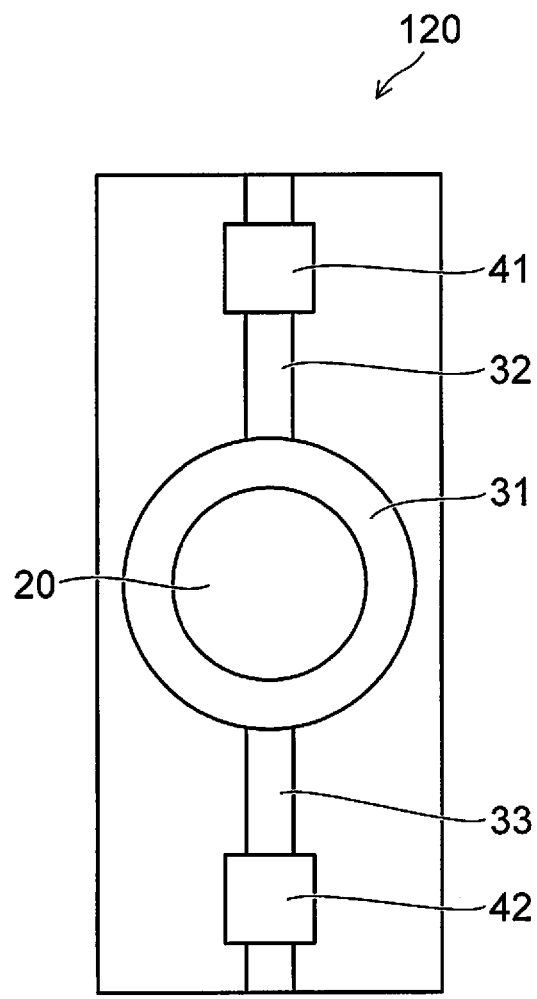
FIGS. 6A and 6B are schematic views illustrating an alternative optical device according to the embodiment.
Figure 6B:
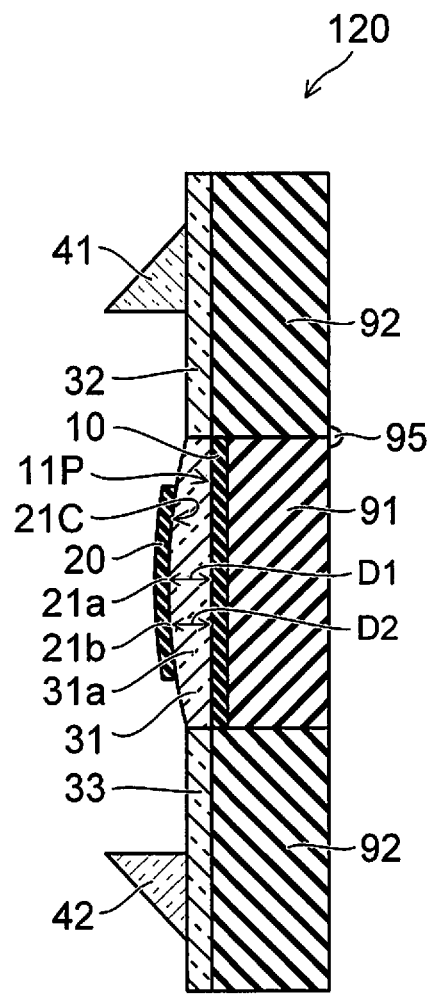

FIGS. 6A and 6B are schematic views illustrating an alternative optical device according to the embodiment.

FIG. 6A is a plan view. FIG. 6B is a sectional view taken along a plane including the X-axis direction and the Z-axis direction.

As shown in FIGS. 6A and 6B, the optical device 120 includes a second member 32, a third member 33, a first support part 91, and a second support part 92.

The first mirror 10 is provided between the first member 31 and the first support part 91. The second support part 92 is provided around the first support part 91. The direction from the first support part 91 to the second support part 92 lies along the X-axis direction or the Y-axis direction. The second support part 92 is in contact with the first support part 91. The second support part 92 is fixed to the first support part 91 with e.g. an adhesive 95.

The second member 32 and the third member 33 are light transmissive. The second member 32 and the third member 33 are solid. The first member 31 is provided between the second member 32 and the third member 33 in the X-axis direction.

Also in the optical device 120, the first distance between the first region 21a and the first planar surface 11P is longer than the second distance between the second region 21b and the first planar surface 11P. The first distance is 0.5 times or less the curvature radius of the concave surface 21C. Alternatively, the first distance is equal to or less the focal length of the concave surface 21C.

(First Practical Example)

Figure 7:
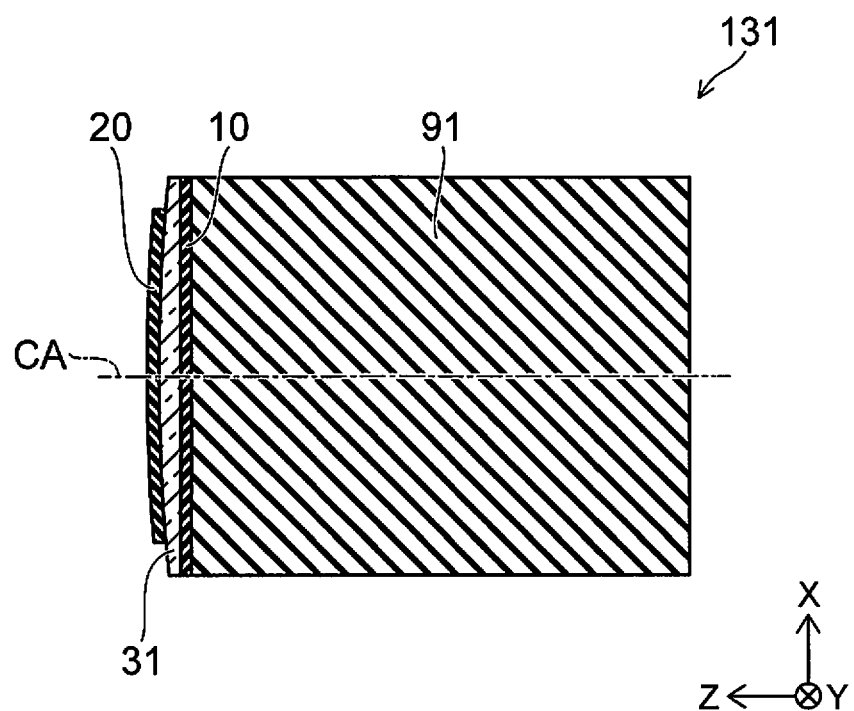
FIG. 7 is a schematic sectional view illustrating an optical device according to a first practical example.

FIG. 7 is a schematic sectional view illustrating an optical device according to a first practical example.

The optical device 131 shown in FIG. 7 includes a first support part 91, a first mirror 10, a second mirror 20, and a first member 31. The first support part 91 is a substrate (e.g. fused silica substrate). The first mirror 10 and the second mirror 20 include a plurality of layers. Each of these layers contains dielectric. The first member 31 is a single crystal of $Y_2SiO_5$.

This optical device 131 is fabricated e.g. as follows.

For instance, a first substrate (fused silica substrate) shaped like a circular column of radius 1.2 mm and height 3 mm is prepared. This first substrate has a planar part. A dielectric multilayer film is formed on the planar part. The transmittance of the dielectric multilayer film at 606 nm is $1\times10^{-3}$. A thin single-crystal plate is bonded in optical contact onto this dielectric multilayer film. This single-crystal plate is made of $Y_2SiO_5$ crystal. The dielectric multilayer film is located between this single-crystal plate and the first substrate. For instance, the B-axis of the bonded single crystal is perpendicular to the contact surface of the single-crystal plate and the dielectric multilayer.

The surface on the opposite side from the bonding surface of the single-crystal plate is polished like a sphere of curvature radius 10 mm. The center of the sphere is located on the central axis CA of the first substrate shaped like a circular column. The central axis CA is a straight line passing through the center of the circle of the top surface of the first substrate and the center of the circle of the bottom surface of the first substrate. The single-crystal plate is polished so that the thickness of the single-crystal plate on this central axis CA is 100 µm. The aforementioned thickness corresponds to the thickness of the thickest portion of the single-crystal plate. A dielectric multilayer film is formed on the sphere of the single-crystal plate. For instance, the transmittance of the dielectric multilayer film at 606 nm is $1.5\times10^{-4}$. This dielectric multilayer film is formed in a region having a radius of approximately 1 mm about the intersection point of the sphere and the central axis CA. Thus, an optical device of curvature radius R=10 mm and resonator length L (first distance D1)=100 µm is fabricated.

On the other hand, like the foregoing, an optical device with the thickness of the single-crystal plate on CA being 9.9 mm is fabricated. This thickness corresponds to the thickness of the thickest part of the single-crystal plate. This optical device has curvature radius R=10 mm and resonator length L (first distance D1)=9.9 mm.

For these two optical devices, the spectral width of the resonator mode near 606 nm is observed. The dissipation of each resonator is measured. $N_{0i}'$ represented by equation 7 is determined.

$N_{0i}'$ of the optical device of resonator length L=100 µm is referred to as first value V1. $N_{0i}'$ of the optical device of resonator length L=9.9 mm is referred to as second value V2. This yields V1/V2=0.3. The mode waist is approximately 10 µm in each of the optical device of resonator length L=100 µm and the optical device of resonator length L=9.9 mm. This result indicates the following for the optical device filled inside with a solid material having absorption or scattering. The optical device of L<R/2 has better performance in terms of critical atom number $N_0$ than the optical device of L>R/2.

(Second Practical Example)

Figure 8A:
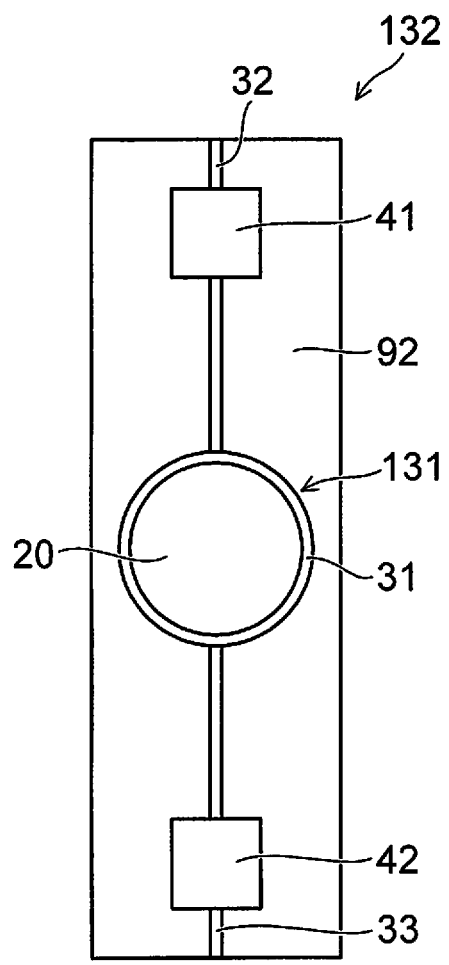
FIGS. 8A and 8B are schematic views illustrating an optical device according to a second practical example.
Figure 8B:
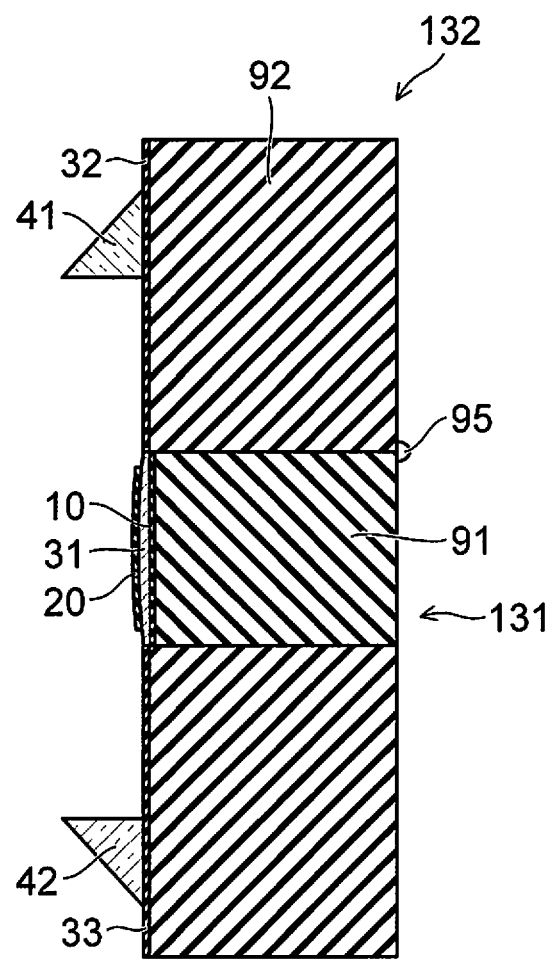

FIGS. 8A and 8B are schematic views illustrating an optical device according to a second practical example.

FIG. 8A is a plan view. FIG. 8B is a sectional view.

The optical device 132 shown in FIGS. 8A and 8B further includes e.g. a second member 32 and a third member 33 compared with the optical device 131.

This optical device 132 is fabricated as follows.

For instance, a second substrate (fused silica substrate) of 3 mm×10 mm×3 mm is prepared. A hole shaped like a circular cylinder of radius 1.2 mm is made in this second substrate. The optical device 131 according to the first practical example of resonator length L=100 µm is inserted in this hole. In the optical device 131, the first mirror 10 is composed of a dielectric multilayer film. The optical device 131 and the optical device 132 are aligned in position so that the surface on the spherical mirror side of this dielectric multilayer film is flush with the first surface of 3 mm×10 mm of the second substrate. The second surface of the second substrate is bonded with an adhesive 95 to the side surface of the first substrate at at least one location. The second surface of the second substrate is a surface on the opposite side from the first surface. In this practical example, the first member contains $Pr^{3+}$ ions of $10^{-4}$ at %. That is, one of $10^6$ $Y^{3+}$ ions contained in the $Y_2SiO_5$ single crystal is replaced by a $Pr^{3+}$ ion.

A $Y_2SiO_5$ target is sputtered using a mask to form a second member 32 and a third member 33 on the first surface of the second substrate. The second member 32 and the third member 33 function as a ridge optical waveguide. This optical waveguide has a width of 10 µm and a thickness of 5 µm. This optical waveguide is connected to the side surface of the first member 31 so that the propagation direction is orthogonal to the symmetry axis of the resonator mode. Furthermore, a first prism 41 and a second prism 42 are provided in order to introduce light to the optical waveguide. A refractive index change may be provided near the bonding portion of the first member 31 and the second member 32, near the bonding portion of the first member 31 and the third member 33, or in the first member 31. Thus, for instance, a GRIN lens structure is formed. By this lens structure, the light introduced into the optical device 131 may be converged to the site occupied by the physical system coupled to the resonator mode. In this practical example, the $D_2$-axis of $Y_2SiO_5$ constituting the first member 31 and containing $Pr^{3+}$ ions is parallel to the plane of the first substrate and orthogonal to the propagation direction of the waveguide. That is, the $D_2$-axis lies along e.g. the Y-axis direction. This optical device is put in a cryostat and cooled to 4 K. In this state, the angular frequency of the resonator mode near 606 nm resonating with $Pr^{3+}$ ions contained in $Y_2SiO_5$ is denoted by $\omega_c$. Weak light of angular frequency $\omega_c$ is coupled to the resonator mode. While monitoring transmission light from this resonator, light of $\omega_c$–27.5 MHz and $\omega_c$–26.7 MHz with the polarization direction being parallel to the $D_2$-axis is applied from the waveguide. Then, the transmission light intensity decreases. Thus, the state of $Pr^{3+}$ ions constituting the physical system coupled to the resonator mode can be effectively manipulated by external light introduced using the waveguide.

FIGS. 9A, 9B, and 10A to 10C are schematic views illustrating an optical device according to the embodiment.

Figure 9A:
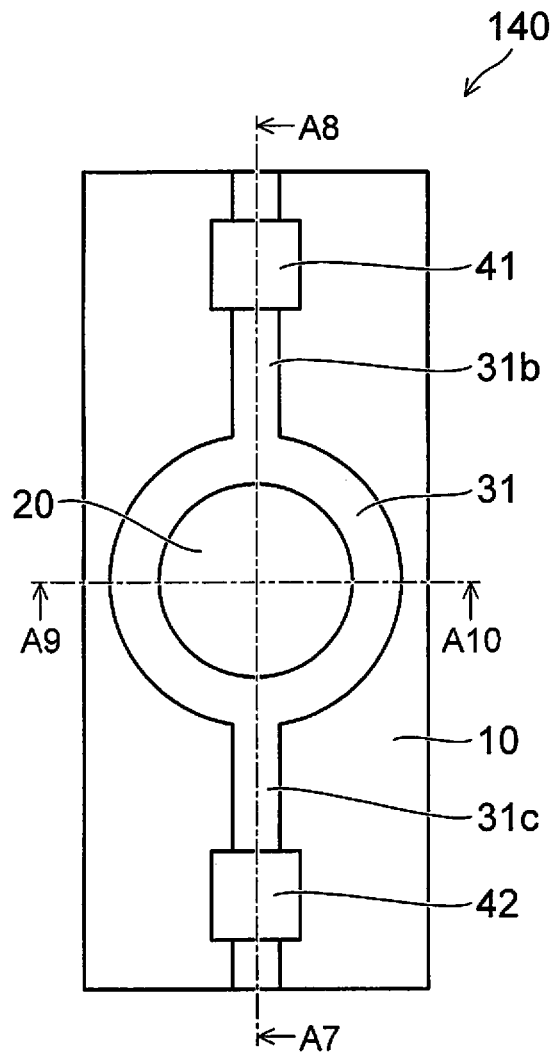
Figure 9B:
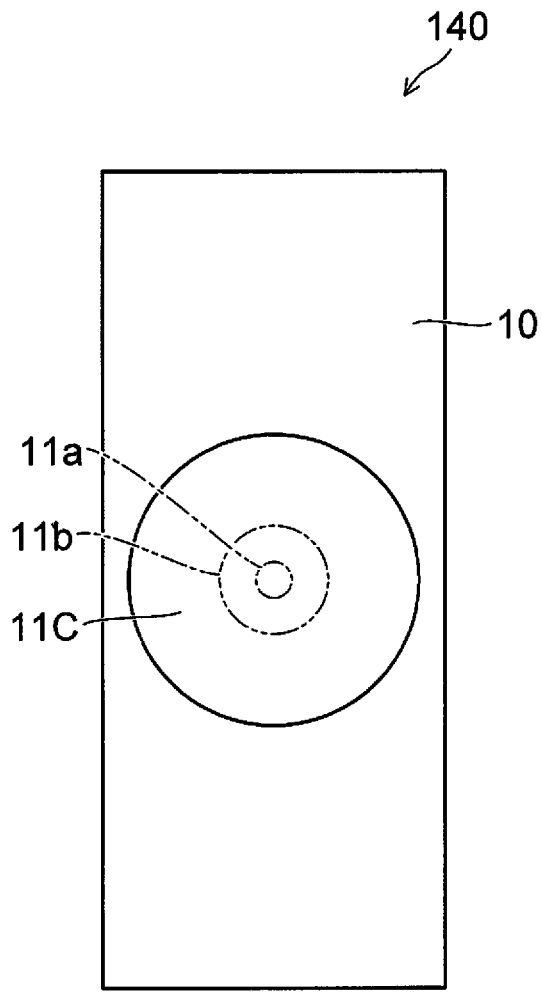

FIG. 10A is a sectional view taken along line A7-A8 of FIG. 9A. FIG. 10B is a sectional view taken along line A9-A10 of FIG. 9A. FIG. 9A is a plan view as viewed in the direction of arrow A11 of FIG. 10A. FIG. 9B is a plan view of the first mirror as viewed in the direction of arrow A11. FIG. 10C is a plan view of the second mirror as viewed in the direction of arrow A12 of FIG. 10A.

In the optical device 140, the first mirror 10 has a first concave surface 11C. The first concave surface 11C includes a first region 11a and a second region 11b around the first region 11a.

The second mirror 20 has a second concave surface 22C. The second concave surface 22C includes a third region 22c and a fourth region 22d around the third region 22c. For instance, the axis passing through the center in the X-axis direction and the Y-axis direction of the second mirror 20 crosses the first region 11a and the third region 22c. This axis lies along e.g. the Z-axis direction. The direction from the first region 11a to the third region 22c lies along the Z-axis direction. The direction from the second region 11b to the fourth region 22d lies along the Z-axis direction. The first member 31 includes a first portion 31a in contact with the first concave surface 11C and the second concave surface 22C.

The first distance D1 in the Z-axis direction between the first region 11a and the third region 22c is longer than the second distance D2 in the Z-axis direction between the second region 11b and the fourth region 22d. The first distance D1 is 0.5 times or less the sum of the curvature radius of the first concave surface 11C and the curvature radius of the second concave surface 22C. Preferably, the first distance D1 is 0.3 times or less the sum of the curvature radius of the first concave surface 11C and the curvature radius of the second concave surface 22C. More preferably, the first distance D1 is 0.1 times or less the sum of the curvature radius of the first concave surface 11C and the curvature radius of the second concave surface 22C.

The first concave surface 11C and the second concave surface 22C may not be spherical.

Thus, the performance of the optical device 140 can be improved. For instance, the characteristics of the optical device can be improved.

The embodiments described above can provide an optical device capable of improving the performance.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components included in the optical device such as the mirror, the first member, the second member, the third member, the prism, the support part, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all optical devices practicable by an appropriate design modification by one skilled in the art based on the optical devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An optical device comprising:
   a first mirror having a first planar surface;
   a second mirror spaced from the first mirror in a first direction crossing the first planar surface, the second mirror having a concave surface including a first region and a second region around the first region, a first distance between the first region and the first planar surface in the first direction being longer than a second distance between the second region and the first planar surface in the first direction, and the first distance being half or less of curvature radius of the concave surface;
   a first member being light transmissive, being solid, and including a first portion provided between the first mirror and the second mirror, the first portion being in contact with the first planar surface and the concave surface;
   a second member being light transmissive, a second direction from the first member toward the second member crossing the first direction, the second member not overlapping the second mirror in the first direction;
a third member, part of the first mirror being located between the first member and the third member in the first direction; and
a fourth member, a direction from the third member toward the fourth member being along the second direction, another part of the first mirror being located between the second member and the fourth member in the first direction.

2. The device according to claim 1, wherein a length along the first direction of at least part of the first member is longer than a length along the first direction of the second member.

3. The device according to claim 1, further comprising a first prism,
the first prism being spaced from the second mirror in the second direction, and
the first prism overlapping part of the second member in the first direction.

4. The device according to claim 3, wherein a direction from part of the first mirror to the first prism is along the first direction.

5. The device according to claim 1, wherein the first mirror contains at least one selected from the group consisting of $TiO_2$, $Ta_2O_3$, $SiO_2$, $MgF_2$, $TiO_3$, and $Nb_2O_5$.

6. The device according to claim 1, wherein the second mirror contains at least one selected from the group consisting of $TiO_2$, $Ta_2O_3$, $SiO_2$, $MgF_2$, $TiO_3$, and $Nb_2O_5$.

7. The device according to claim 1, wherein the first member contains at least one selected from the group consisting of $Y_2SiO_5$, $LF_3$, $SiO_2$, and C.

8. An optical device comprising:
a first mirror having a first planar surface;
a second mirror spaced from the first mirror in a first direction crossing the first planar surface, the second mirror having a concave surface including a first region and a second region around the first region, a first distance between the first region and the first planar surface in the first direction being longer than a second distance between the second region and the first planar surface in the first direction, and the first distance being half or less of curvature radius of the concave surface;
a first member being light transmissive, being solid, and including a first portion provided between the first mirror and the second mirror, the first portion being in contact with the first planar surface and the concave surface;
a second member being light transmissive, the second member not overlapping the second mirror in the first direction; and
a third member being light transmissive, the third member not overlapping the second mirror in the first direction, the first member being located between the second member and the third member in a second direction crossing the first direction.

9. The device according to claim 8, wherein a length along the first direction of at least part of the first member is longer than a length along the first direction of the second member and longer than a length along the first direction of the third member.

10. The device according to claim 9, further comprising a first prism,
the first prism being spaced from the second mirror in the second direction, and
the first prism overlapping part of the second member in the first direction.

11. The device according to claim 10, wherein a direction from part of the first mirror to the first prism is along the first direction.

12. The device according to claim 10, further comprising a second prism,
the second prism being spaced from the second mirror in the second direction, and
the second prism overlapping part of the third member in the first direction.

13. The device according to claim 8, wherein the first mirror contains at least one selected from the group consisting of $TiO_2$, $Ta_2O_3$, $SiO_2$, $MgF_2$, $TiO_3$, and $Nb_2O_5$.

14. The device according to claim 8, wherein the second mirror contains at least one selected from the group consisting of $TiO_2$, $Ta_2O_3$, $SiO_2$, $MgF_2$, $TiO_3$, and $Nb_2O_5$.

15. The device according to claim 8, wherein the first member contains at least one selected from the group consisting of $Y_2SiO_5$, $LF_3$, $SiO_2$, and C.

16. An optical device comprising:
a first mirror having a first concave surface including a first region and a second region provided around the first region;
a second mirror spaced from the first mirror in a first direction, the second mirror having a second concave surface including a third region and a fourth region provided around the third region, first distance between the first region and the third region in the first direction being longer than second distance between the second region and the fourth region in the first direction, and the first distance being 0.5 times or less of sum of curvature radius of the first concave surface and curvature radius of the second concave surface;
a first member being light transmissive, being solid, and including a first portion provided between the first mirror and the second mirror, the first portion being in contact with the first concave surface and the second concave surface;
a second member being light transmissive, a second direction from the first member toward the second member crossing the first direction, the second member not overlapping the second mirror in the first direction;
a third member, part of the first mirror being located between the first member and the third member in the first direction; and
a fourth member, a direction from the third member toward the fourth member being along the second direction, another part of the first mirror being located between the second member and the fourth member in the first direction.

17. The device according to claim 16, wherein the first mirror contains at least one selected from the group consisting of $TiO_2$, $Ta_2O_3$, $SiO_2$, $MgF_2$, $TiO_3$, and $Nb_2O_5$.

18. The device according to claim 16, wherein the second mirror contains at least one selected from the group consisting of $TiO_2$, $Ta_2O_3$, $SiO_2$, $MgF_2$, $TiO_3$, and $Nb_2O_5$.

19. The device according to claim 16, wherein the first member contains at least one selected from the group consisting of $Y_2SiO_5$, $LF_3$, $SiO_2$, and C.

20. An optical device comprising:
a first mirror having a first planar surface;
a second mirror spaced from the first mirror in a first direction crossing the first planar surface, the second mirror having a concave surface including a first region and a second region around the first region, a first distance between the first region and the first planar surface in the first direction being longer than a second distance between the second region and the first planar surface in the first direction, and the first distance being half or less of curvature radius of the concave surface;

a first member being light transmissive, being solid, and including a first portion provided between the first mirror and the second mirror, the first portion being in contact with the first planar surface and the concave surface;

a second member being light transmissive, a second direction from the first member toward the second member crossing the first direction, the second member not overlapping the second mirror in the first direction; and a first prism being spaced from the second mirror in the second direction, the first prism overlapping part of the second member in the first direction.

* * * * *